United States Patent [19]
Foulke

[11] 4,146,013
[45] Mar. 27, 1979

[54] SOLAR-EXOTHERMIC SOLUTION HEAT PUMP

[76] Inventor: Willing B. Foulke, 109 Greenridge Rd., Wilmington, Del. 19804

[21] Appl. No.: 793,484

[22] Filed: May 4, 1977

Related U.S. Application Data

[63] Continuation-in-part of Ser. No. 625,575, Oct. 24, 1975, abandoned.

[51] Int. Cl.² .......................... F24J 3/02; F25B 27/00
[52] U.S. Cl. ........................................ 126/271; 165/1; 62/2
[58] Field of Search ...................... 62/2; 126/270, 271; 165/1

[56] References Cited
U.S. PATENT DOCUMENTS

| | | | |
|---|---|---|---|
| 2,396,338 | 3/1964 | Newton | 126/271 |
| 2,693,939 | 11/1954 | Marchant et al. | 62/2 |
| 2,860,493 | 11/1958 | Capps et al. | 62/2 |
| 3,104,210 | 9/1963 | Mount | 126/271 |
| 3,152,442 | 10/1964 | Rowekamp | 126/271 |
| 3,242,679 | 3/1966 | Puckett et al. | 62/2 |
| 3,262,493 | 7/1966 | Hervey | 126/271 |
| 3,894,528 | 7/1975 | Stubblefield | 126/271 |
| 3,908,632 | 9/1975 | Poulsen | 126/271 |
| 3,973,552 | 8/1976 | Ervin, Jr. | 126/271 |
| 3,994,675 | 11/1976 | Sasse et al. | 126/270 |

Primary Examiner—Lloyd L. King
Attorney, Agent, or Firm—Robert Jacobs

[57] ABSTRACT

A novel heat pump using solar energy and the heat of dilution of exothermic inorganic salts and organic compounds is disclosed. The heat pump is made up of four parts including a solar energy absorbing surface, a means for diluting the concentrated solution, and heat exchange apparatus to take the heat of dilution and distribute it to the space to be heated.

10 Claims, 4 Drawing Figures

SOLAR-EXOTHERMIC SOLUTION HEAT PUMP

This application is a continuation in part of application Ser. No. 625,575, filed Oct. 24, 1975, now abandoned, by Willing B. Foulke.

This invention relates to a novel heat pump. More particularly, this invention relates to a heat pump which utilizes solar and chemical energies to produce heating for a space.

The utilization of fossil fuels for generating energy to heat a dwelling or "space" has been under attack from many quarters. First and foremost are the problems with the limited amount of fuel available and secondarily the pollution caused by such fuels and the destruction of needed chemical building blocks through inefficient combustion. One source of energy which is limitless, for as long as our planet can support human life, is the vast quantities of heat showering down daily from the sun. Heretofore, there have been many inventions which attempt to use solar energy for heating or cooling. Certain publications such as the University of Delaware Reporter, Volume 4, Number 1, dated October, 1973, show how to utilize the energy of the sun to produce electricity which in turn is then used for the production of heating and lighting. Patents such as U.S. Nos. 2,343,211, 2,544,474 and 2,575,478 utilize solar energy to heat a heating transfer fluid for a heat pump. All of the methods and apparati disclosed either store insufficient heat for maintaining uniform heating of the space to be heated and/or the expense of installation, due to the cost of material used to store the latent heat of fusion, is excessive.

It is an object of this invention to utilize the solar energy in conjunction with exothermic salt solutions for the generation of heat.

Another object of this invention is to provide a heat pump capable of maintaining an even temperature through winter periods by use of solar energy.

Still other objects of this invention will become evident to those skilled in the art by reading this specification.

Referring to FIG. 1, the basic items of this invention are:

a solar evaporative surface, indicated as 1;

a means for dissolving or diluting salt solutions and organic solutions shown as 2;

a heat exchange means to heat the fluid used for space heating shown as 3;

a heat exchange means for heating the space to be heated shown as 4;

the area to be heated indicated as 5.

Figure 1:
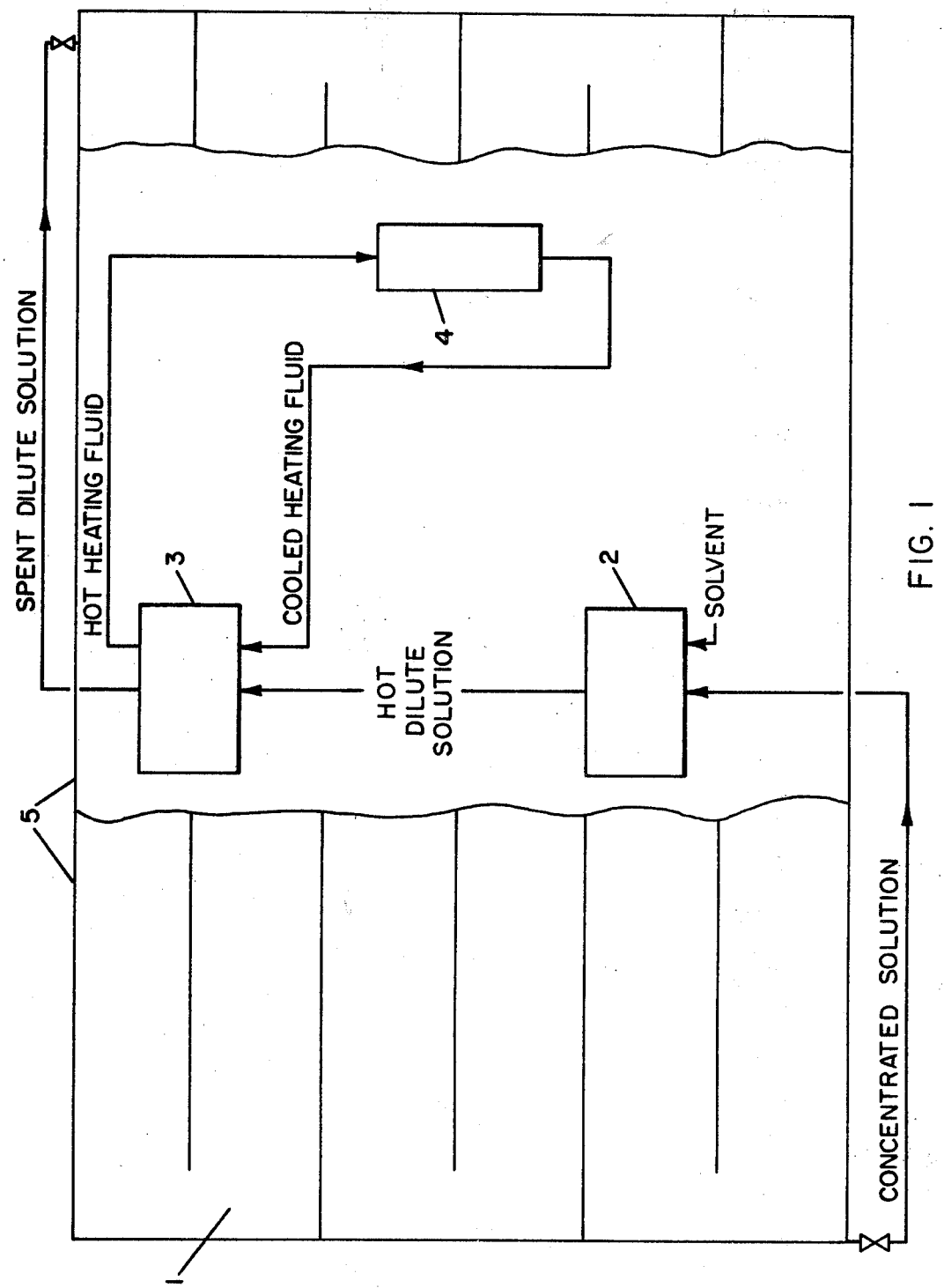
Figure 2:
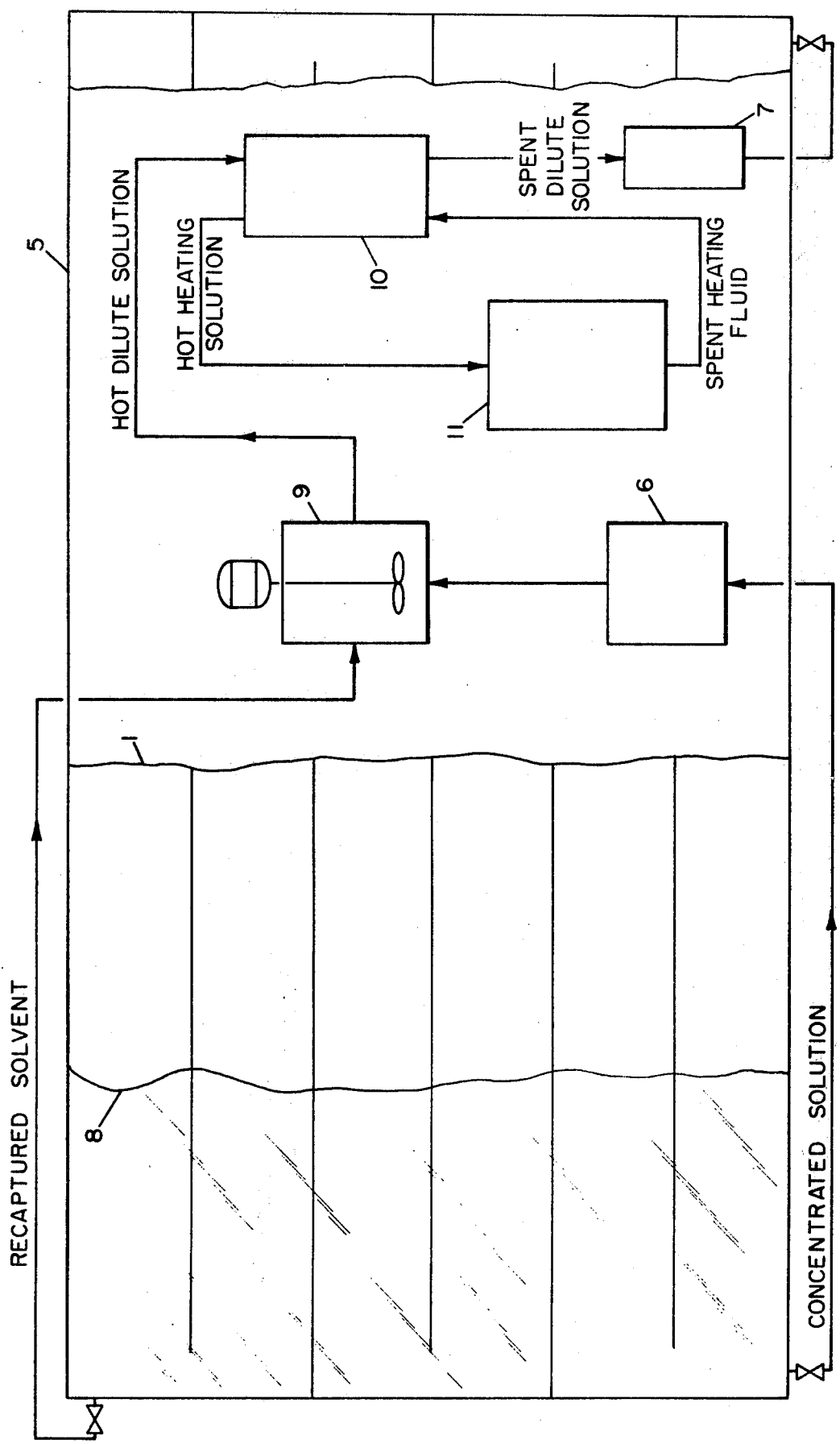
FIG. 2 is a more detailed schematic of supplementary items which may be incorporated into the heat pump of this invention, including 6, a collection tank for the storage of concentrated solution; 7, a dilute solution storage container; 8, a solvent recovery refractor; 9, a mixing vessel; 10, a heat exchanger; and 11 a system for distributing the heating fluid.

As can be gathered from the brief description of the drawings given above and the objects of this invention, the invention covers an apparatus which utilizes exothermic salt or organic solutions for the generation of heat in conjunction with solar energy. The interaction of the various items are as follows. FIG. 2 shows that the space to be heated, 5, is heated using the apparatus. The apparatus functions using a salt solution of an exothermic salt or organic compound. The concentrated salt solution, which is stored in a storage vessel, 6, is mixed with the solvent in a mixing vessel, 9 in FIG. 2. The mixing is merely a dilution which is accomplished by the addition of solvent directly into the mixing vessel and pumping the concentrated solution through the line connecting the two blocks in the figure, that is block 6, the concentrated solution storage vessel and block 9, the mixing vessel. This dilution causes generation of heat due to the exo-thermic nature of the salt or organic compound. The diluted solution, called a hot dilute solution, is then circulated into a heat exchange means, 10, where it is contacted with a heating fluid. The heating fluid is then circulated through the space to be heated to utilize the heat generated by the dilution. At this point, assuming that a separate heating fluid, other than the hot dilute solution, is utilized the hot dilute solution will have been cooled by giving up its heat to the heating fluid and is a spent dilute solution. The spent dilute solution is circulated to the solar evaporating surface, 1, where it is acted upon by the heat of the sun, relative humidity, and vapor pressure and reconcentrated by the evaporation of water, solvent, such as into the concentrated solution. The concentrated solution is collected from this surface, allowed to flow through a pipe as indicated on FIG. 2, back into the concentrated solution storage tank, Item 6. An alternative as shown in FIG. 2 is to have a spent dilute solution storage container, 7, so that after passing through the heat exchanging means it is collected and only pumped to the solar evaporating surface during periods of sunlight. As indicated above, the hot dilute solution may be circulated through radiators or the like and heat the space to be heated directly. In this case there is no need for an intermediate heating fluid and the hot dilute solution once cooled by going through the space to be heated would be collected in the storage vessel for spent dilute solution, 7. Then the spent dilute solution would be circulated to the solar evaporating surface where it would be reconcentrated by the evaporation of the solvent, in this case water. The reconcentrated solution would flow from the solar evaporating surface into the concentrated salt solution storage vessel, 6.

Figure 3:
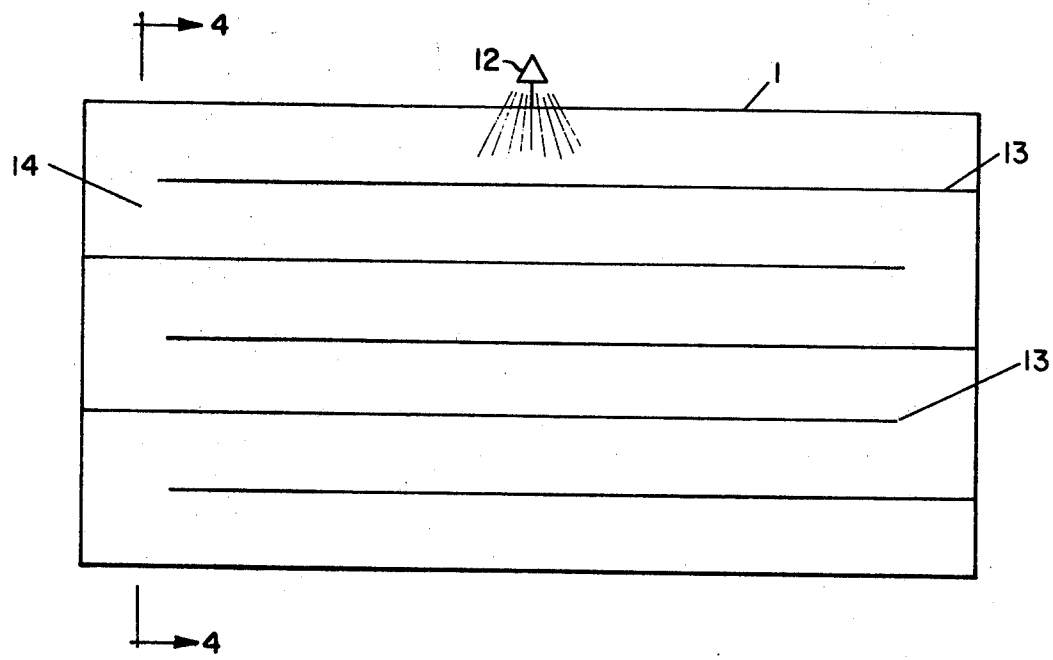
FIG. 3 is a more detailed view of the solar evaporating surface; 12 is a spray nozzle; 13 is a channel guard, and 14 is the dark solar surface.
Figure 4:
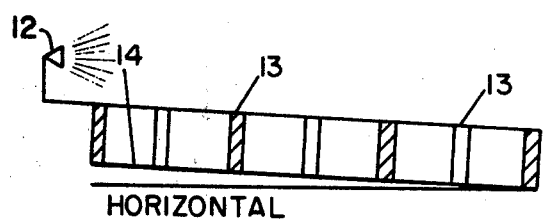
FIG. 4 is a sectional view taken along line 4—4 of FIG. 3.

The heat pump functions as follows. A concentrated solution of an exo-thermic salt, i.e. a salt which upon dilution gives up heat to the surroundings, is mixed in a closed container, 9, or through a mixing valve, or screw mixing coveyor with additional solvent; the further dilution of the solution generates heat raising the temperature of resulting diluted solution in accordance with the applicable thermodynamic laws. This hot and more dilute solution is then intimately contacted through a heat exchanging means, 10, such as a multipass counter current heat exchanger with a heating fluid which may be air, an inert gas such as Helium or Nitrogen, mineral oil, water, a halogenated hydrocarbon such as Freon ® or other more exotic organic heat transfer mediums such as Dowtherm ®. This heated heating fluid is then circulated through the area which is to be heated, 5. Said heating fluid is usually circulated through the area through a heat exchange means, 11, which dissipates the heat to the surroundings. As indicated above, forced air, water and other heated fluids can be used. Naturally, if forced air is used, Item 11 would merely be the duct system for carrying it to the various parts of the house. After dissipating its heat, the waste heat may be utilized to pre-heat the solvent prior to its contacting the concentrated solution. As indicated above the dilute solution can be used to heat the space by being placed in direct heat exchange means with the space to be heated and avoid the intermediate heating fluid. Referring to FIG. 2, the spent dilute solution may be placed in a storage vessel, 7, prior to its being placed in the solar evaporating surface, 1, for reconcentration. As is shown in FIGS. 3 and 4, the spent dilute solution may be sprayed on the roof by use of spray nozzle, 12. The spent dilute solution is then circulated to a solar evaporating surface, where, through the heat of the sun and the relative humidity factors, it is reconcentrated to the concentrated level and the cycle is started again. Referring to FIG. 2, it is obvious that the cycle is started again by the concentrated solution flowing to the collecting tank, 6, and then reutilized by mixing with fresh solvent in the mixing area, such as 9. Naturally, outside energy may be needed to pump both the salt solution and the heating fluid through the cycle described. However, the amount of energy is nominal.

With regard to operating the system, when no solar heat is available for concentration, it is obvious, to anyone skilled in the art, that a ten-to-seventy-two-hour storage vessel, 7, for spent dilute solution will be needed for 24-hour operation of this heat pump. However, continuous operation during daylight hours without any storage capacity of either dilute or concentrated solution is feasible with proper design of the solar evaporative surface.

With regard to the exo-thermic salts, in general, a heat of dilution to infinite dilution of 300 BTU's per pound mole solute is necessary to economically utilize this process in spaces requiring heat or cooling. However, depending upon the amount of heat necessary, due to the geographical location of the structure using this novel heat pump, salts with lower heats of dilution may be used. Inorganic compounds which have the properties described include lithium iodide, potassium hydrate, chromium chloride, calcium iodide and calcium chloride, aluminum chloride, and aluminum bromide, magnesium bromide, chloride and iodide, manganese chloride and sulfate, chromium tetrochloride, as well as the tri-chloride mentioned above. Organic compounds of interest include: triethylamine, diperidine, ethyl acetate, diisobutyl amine, cyclohexanol, calcium benzoate, allyl amine, allyl alcohol, acetone, and acetic acid. To more fully illustrate the range of heat of dilution contemplated, a limited list of salts and organic compounds which can be utilized for this heat pump is given in Table I, (the solvent for Table 1 is water).

TABLE 1

| Compound | Moles of Solvent/ Moles Solute | Heat of Dilution BTU's/1B-mole |
|---|---|---|
| Acetic Acid [$CH_3COOH$] | 200 | 670 |
| Aluminum Bromide [$AlB_r3$] | 2970 | 154,080 |
| Aluminum Chloride [$AlCl_3$] | 1250 | 138,320 |
| Aluminum Iodide [$AlI_3$] | 2260 | 160,200 |
| Antimony Penta Chloride [$SbCl_5$] | 1100 | 63,360 |
| Calcium Bromide [$CaBr_2$] | 400 | 44,120 |
| Calcium Chloride [$CaCl_2$] | 300 | 31,330 |
| Calcium Iodide [$CaI_2$] | | 51,000 |
| Cobalt Chloride [$CoCl_2$] | 400 | 33,010 |
| Copper Sulfate [$CuSO_4$] | 230 | 28,440 |
| Allyl Alcohol | | 3,600 |
| Allyl Amine | | 8,450 |
| Amyl Amine | | 9,100 |

TABLE 1-continued

| Compound | Moles of Solvent/ Moles Solute | Heat of Dilution BTU's/1B-mole |
|---|---|---|
| Calcium Benzoate | | 8,480 |
| Diiso Butylamine | | 12,700 |
| Triethyl amine | | 18,000 |

The heat of dilution illustrated in Table 1 are not all infinite dilutions, but to moles of solvent per mole of solute as illustrated for the inorganic salts by indicating the moles of water present per mole of salt. Where no number is given the heat is to infinite dilution. However, the entire heat shown in Table 1 is not available either, as the initial heat liberated to place the compound in solution is obtained only when the compound is first dissolved.

To illustrate the heat available for the heat pump, if one were to use an aqous solution of calcium chloride at 35% weight percent calcium chloride and dilute it to 20 weight percent calcium chloride one would liberate 2,700 BTU's of heat per mole of calcium chloride and be required to add about 4.2 moles of water to achieve this dilution. In order to reconcentrate the solution one needs about 75,600 BTU's to evaporate 4.2 moles of water. Naturally, the amount of heat liberated depends upon the particular compound chosen. Thus if Antimony Pentachloride is utilized as the salt, although the cost of the salt is greater, the heat realized by the dilution of solutions equivalent to those given for calcium chloride above would be about 5,500 BTU's of heat per mole of salt with the addition of 4.2 moles of water.

Other than which salt or organic compound is used as a heat source the other variables of this heat pump include the available solar heat in the locale of the space to be heated, the heat transfer fluids, the size of the solar evaporating surface, and the insulation available for reducing heat loss.

The amount of energy available from the solar source is dependent upon the latitude, the months of the year, the angle of the collecting surface to the incident radiation, as well as atmospheric conditions. In the Handbook of Mechanical Engineering an article by Hoyt C. Hottel appears entitled "Solar Energy for Heating." The various parameters for predicting solar heating values is discussed and to a great extent are empirical. According to the engineers working on "Solar House One" at the University of Delaware the incident average daily energy available during January in Newark, Delaware is 717 BTU's per square foot. For February the incident available heat for Newark, Delaware is 1840 BTU's per square foot and December is still higher. The average January temperature for Delaware is 38 degrees.

Similar measurements have not been made further south but using the Hottel figures one can calculate incident figures at other latitudes as shown in Table II below.

TABLE II

| City | Latitude | Incident Heat (Angles Surface) BTU's/sq. ft/day | Average January Temp. °F |
|---|---|---|---|
| Wilmington, DE | 39°40'N | 717 | 38 |
| Baltimore, MD | 39°17'42"N | 780 | 35 |
| Richmond, VA | 37°32'38"N | 850 | 39 |
| Raleigh, N.C. | 35°46'38"N | 915 | 42 |
| Charleston, | | | |

TABLE II-continued

| City | Latitude | Incident Heat (Angles Surface) BTU's/sq. ft/day | Average January Temp. °F |
|---|---|---|---|
| S.C. Savannah, GA | 32°46'35"N | 1060 | 50 |
| Orlando, FL | 32°46'35"N | 1063 | 52 |
| | 28°32'42"N | 1110 | 60 |

For the purposes of this description a well insulated two-story house; those homes containing 8 inches of fibre glass insulation in the attic, 4 inches of fibre glass insulation in all walls, double pane thermo windows and storm doors; which contain about 2800 square feet of living area with eight foot ceilings, will lose 10,000 BTU's per degree day. A degree day is defined as a day where the average temperature is one degree below 65° F. The preferred embodiment of this invention is illustrated in Example I.

EXAMPLE I

An office building containing 2,800 square feet of interior space with the insulation characteristics as follows: 8 inches of fiberglass insulation in the roof area, 4 inches of fiberglass insulation along the walls, double-pane windows and storm doors, is 2 stories in construction and has a flat roof collector area of 2,000 square feet. Assuming that this building is in a Southern city, for example, Georgia, which has an average daily temperature of 55 degrees in January, this heating system will work as follows. First, the heat loss in a given day will be 100,000 BTU's per day or 10,000 BTU's for a 10 degree day. (Based on the degree days being counted at the difference of the average degrees below 65 degrees Fahrenheit). A system comprising a solvent recovery refractory, such as Item 8, a dilute solution storage container, 7, a collection tank for the storage of concentrated solutions, 6, a tube and shell heat exchanger, 10, a forced air heat distribution system, 11, a dark solar surface, 14, with channel guards, 13, and a solvent recovery factor, 8, all installed in the building. An initial volume of 5,000 gallons of a 35 weight percent calcium iodide is stored in the concentrated solution storage vessel. This concentrated solution is then diluted in a mixing vessel with additional water, bringing this concentration to 20 weight percent calcium iodide. The dilution generates 4,200 BTU's for every 4.2 moles of diluting water. The hot solution is now contacted with the ambient air through the tube and shell heat exchanger thereby giving its heat up to said air. The hot air is then circulated through the building to heat the building. The cool spent dilute solution is now collected in the dilute solution storage tank. It is then pumped from the storage tank to the flat roof collector area, allowing it to flow slowly through the channelized collector in contact with the evaporating surface, thereby absorbing the sun's radiation and reconcentrating the solution to 35 weight percent calcium iodide. The concentrated solution is collected at the bottom of the collector in accordance with FIGS. 3 and 4 and placed again in the concentrated solution storage tanks.

In an area such as the city depicted, the available solar energy is 1,064 BTU's per square foot per day of solar surface or 2,150,000 BTU's per day for the 2,000 square foot surface. The ratio of BTU's useable for heating the collective surface, versus that reclaimed by reconcentrating the heat the salt solution is the efficiency constant (dimensionalist number of the salt heat of dilution using calcium iodide is $559 \times 10^{-4}$). Using this factor 12,000 BTU's are produced per day by the system. The heat available for evaporation thus is more than the amount necessary for the average heating load to reconcentrate the solution.

The following examples omit dilution of the concentrated fluid and distribution of the heat as well as the statements about recollecting the reconcentrated solution and merely depict the fact that in various locations using various exothermic salt solutions, there is sufficient heat generated from solar energy to reconcentrate the diluted salt solution and thus reutilize it in the heating of the house.

EXAMPLE 2

House of 2800 square feet living area; and all criteria of Example 1. The salt Aluminum iodide is utilized. Therefore, the ratio of available heat to heat generated, the efficiency constant, for the system is $169 \times 10-3$.

With 2,150,000 BTU's per day available, then 384,000 BTU's would be available to heat the house or an excess of 285,000 BTU's/day. Thus a solar evaporative surface of 555 square feet would suffice for this home.

EXAMPLE 3

An office of 2,500 square feet with insulation as indicated in Example 1 will lose 8,950 BTU's per degree day. This office is located in an area such as Raleigh, N.C., where the average temperature is 42° F. and the average incident heat is 915 BTU's/sq. ft/day.

There are 23 degree days resulting in a heat loss of 206,000 BTU's/day.

With a roof area of 1500 square feet and using Aluminum Iodide the system will generate 288,000 BTU's per day.

EXAMPLE 4

Orlando, Fla. mean January temperature of 60° F. with an incident heat of 1110 BTU's/square foot.

There are five degree days with a ranch house of 2800 square feet living area. This type of home will require 15,000 BTU's/degree day or a total of 75,000 BTU's per day.

Using Calcium Chloride the efficiency constant, the heat of dilution/heat of evaporation, and the incident heat multiplied by square feet of solar surface, 1110 BTU's sq. ft $\times$ 2500 sq. ft., 2,780,000 BTU's, per day are available for heating the building from solar sources. Applying the constant the system will generate 99,000 BTU's/day or an excess of 25% over building requirements.

The heating fluid, that is the fluid which is circulated through the space to be heated, can vary and its specific heat characteristics will affect the efficiency of the overall system. Thus a fluid which has a low temperature of vaporization such as 100° F. and then yields a large quantity of heat upon condensation would be a perfect heating fluid since the dilution of the exothermic salt solution will only result in the diluted exothermic salt solution attaining temperatures between about 100° F. to about 150° F. A fluid having the characteristics needed is Freon ® or similar fluorinated halogenated compounds. Freon ® 114 is Dichlorotetrafluoraethane, other Freon ® compounds include hexafluoraethane, tetrachlorodifluoraethane, octafluorocyclobutane and trichloro trifluoroethane.

EXAMPLE 5

A space of 2500 square feet with a heat loss of 8,950 BTU's per degree day is situated in a locale where the mean January temperature is 45° F. and the incident heat is 1000 BTU's per square foot per day. The solution generated 200,000 BTU's per day with a solar surface of 2,000 square feet. The solution of 35% salt at a temperature of 75° F. is diluted to 20% salt dilution by the addition of 5 moles of water. The temperature of the diluted solution is raised to 140° F. The hot dilute solution is pumped through a counter current heat exchanger contacted with Freon ® 114, a product of duPont Co. thereby vaporizing the liquid Freon ® 114. Said vapor is circulated heating the space. The diluted solution is sprayed on to the solar surface and water removed by evaporation until it is reconcentrated.

The solar surface of the invention consists of a smooth dark surface, 14, FIG. 3, equipped with a spray means or nozzle, 12, and channels, 13, for directing the dolution flow, the object at the surface is the even flow of solution at the maximum exposure. In addition, it is contemplated that one could collect the evaporated solvent with a clear shield such as plexiglass, 18. The shield would allow the sun rays through, but tend to cause condensation of the escaping vapor which would be recirculated as dilution solvent. The recirculation would minimize the need for additional solvent and act as a conservation measure. Naturally, water is the preferred solvent, especially if it is not recaptured. Other solvents may include acetone, ethyl ether, propanol, ethanol, benzene, toluene, isobutane and other similar solvents.

Having thus described my invention I claim:

1. A heating system comprising in combination a space to be heated, an evaporating surface arranged to receive solar energy, a salt solution of an exothermic salt, a solvent source, a mixing means for mixing said salt solutions and said solvent to form a dilute salt solution, a means for causing said dilute salt solution to flow across and in contact with said evaporating surface so that said dilute salt solution is reconcentrated and then flows by duct means to said mixing means wherein solvent is added, diluting said salt with the generation of heat; a means for causing said diluted salt solution to give up its heat to the space to be heated in a heat exchange relation with said space to be heated when said space is below a predetermined temperature, wherein said exothermic salt has a heat of dilution to infinite dilution of at least 300 BTU's per pound mole solute.

2. A heating system in accordance to claim 1 containing a means wherein the heated dilute solution is placed in heat exchange relation with a heating fluid and said heating fluid is then circulated to the space to be heated in a heat exchange relation with said space to be heated when said space is below a predetermined temperature.

3. A heating system according to claim 1, wherein said exothermic salt or organic compound is selected from the group consisting of Acetic Acid, $AlBr_3$, $AlCl_3$, $SbCl_5$, $CaCl_2$, $CaBr_2$, $CaI_2$, $CoCl_2$, $CuSO_4$, Allyl Alcohol, Allyl Amine, Amyl Amine, Calcium Benzoate, Diiso Butylamine and Triethyl Amine.

4. A heating system according to claim 2, wherein said heating fluid is water, Freon ®, Dowtherm ®, mineral oil, air, or an inert gas.

5. A heating system in accordance with claim 1, wherein said evaporating surface is covered with a transparent shield to block the evaporating solvent vapor, thus condensing same and the then transmitting the condensed solvent for reuse in the system.

6. A heating system in accordance with claim 1, wherein said concentrated exothermic salt solution is stored, with sufficient solution for 14 hours of continuous system use and a storage vessel with sufficient volume for 14 hours of dilute solution storage.

7. A heating system according to claim 1, wherein said exothermic salt is selected from the group consisting of $AlBr_3$, $AlCl_3$, $AlI_3$, $SbCl_5$, $CaCl_2$, $CaBr_2$, $CaI_2$, $CoCl_2$ and $CuSO_4$.

8. A heating system according to claim 4, wherein said heating fluid is water, Freon ®, Dowtherm ®, mineral oil, air, or an inert gas.

9. A heating system according to claim 6, wherein said exothermic salt or organic compound is selected from the group consisting of Acetic Acid, $AlBr_3$, $AlCl_3$, $AlI_3$, $SbCl_5$, $CaCl_2$, $CaBr_2$, $CaI_2$, $CoCl_2$, $CuSO_4$, Allyl Alcohol, Allyl Amine, Amyl Amine, Calcium Benzoate, Diiso Butylamine and Triethyl Amine.

10. A heating system according to claim 6, wherein said heating fluid is water, Freon ®, Dowtherm ®, mineral oil, air or an inert gas.

* * * * *